United States Patent
Sahlholm et al.

(10) Patent No.: US 10,739,143 B2
(45) Date of Patent: Aug. 11, 2020

(54) METHODS AND CONTROL UNITS FOR BUILDING A DATABASE AND FOR PREDICTING A ROUTE OF A VEHICLE

(71) Applicant: Scania CV AB, Södertälje (SE)

(72) Inventors: Per Sahlholm, Huddinge (SE); Oskar Ekstrand, Stockholm (SE); Patrik Pivén, Årsta (SE)

(73) Assignee: Scania CV AB, Södertälje (SE)

( * ) Notice: Subject to any disclaimer, the term of this patent is extended or adjusted under 35 U.S.C. 154(b) by 262 days.

(21) Appl. No.: 15/747,101

(22) PCT Filed: Jun. 30, 2016

(86) PCT No.: PCT/SE2016/050670
§ 371 (c)(1),
(2) Date: Jan. 23, 2018

(87) PCT Pub. No.: WO2017/026936
PCT Pub. Date: Feb. 16, 2017

(65) Prior Publication Data
US 2018/0372501 A1    Dec. 27, 2018

(30) Foreign Application Priority Data
Aug. 11, 2015    (SE) ....................... 1551062

(51) Int. Cl.
*G08G 1/123* (2006.01)
*G01C 21/32* (2006.01)
(Continued)

(52) U.S. Cl.
CPC ......... *G01C 21/32* (2013.01); *G01C 21/3617* (2013.01); *G06F 16/29* (2019.01)

(58) Field of Classification Search
CPC ...... G01C 21/32; G01C 21/3617; G06F 16/29
See application file for complete search history.

(56) References Cited

U.S. PATENT DOCUMENTS

2007/0179708 A1    8/2007   Sekine et al.
2007/0255452 A1*   11/2007   Kwon ................. G05D 1/0259
                                                  700/245
(Continued)

FOREIGN PATENT DOCUMENTS

DE    102010042065 A1    4/2012
EP         2623932 A2    8/2013
(Continued)

OTHER PUBLICATIONS

Kucner et al. Nov. 3-7, 2013. "Conditional Transition Maps: Learning Motion Patterns in Dynamic Environments" (Year: 2013).*
(Continued)

*Primary Examiner* — Harry Y Oh
(74) *Attorney, Agent, or Firm* — Moore & Van Allen PLLC; W. Kevin Ransom

(57) ABSTRACT

Provided are methods and control units for building a database and for predicting a route of a vehicle, and estimating length of the predicted route. The method comprises determining geographical position of the vehicle; detecting a cell border of a cell in a grid-based representation of a landscape, in a database, corresponding to the geographical position; determining that the vehicle is entering the cell at the cell border; extracting a stored driving direction at the cell border from the database; detecting a cell border of a neighbor cell, in the driving direction at the cell border; repeating step and; predicting the route of the vehicle; and estimating the length of the predicted route by adding an estimated distance through each cell of the predicted route.

10 Claims, 10 Drawing Sheets

(51) Int. Cl.
*G01C 21/36* (2006.01)
*G06F 16/29* (2019.01)

(56) References Cited

U.S. PATENT DOCUMENTS

| | | | |
|---|---|---|---|
| 2010/0114474 A1 | 5/2010 | Suganuma et al. | |
| 2010/0287207 A1* | 11/2010 | Motoyama | G06F 16/29 707/803 |
| 2010/0324752 A1 | 12/2010 | Suganuma et al. | |
| 2011/0130951 A1* | 6/2011 | Lee | G01C 21/32 701/532 |
| 2013/0006517 A1 | 1/2013 | Ofek et al. | |
| 2013/0254147 A1* | 9/2013 | Landau | G06N 5/04 706/46 |
| 2014/0190514 A1* | 7/2014 | Lamon | G05D 1/0219 134/6 |

FOREIGN PATENT DOCUMENTS

| | | |
|---|---|---|
| JP | 2001229493 A | 8/2001 |
| JP | 2004037141 A | 2/2004 |
| JP | 2013160504 A | 8/2013 |
| WO | 2009118624 A1 | 10/2009 |

OTHER PUBLICATIONS

Scania CV AB, International Application No. PCT/SE2016/050670, International Preliminary Report on Patentability, dated Feb. 13, 2018.

Kucner et al. 'Conditional Transition Maps: Learning Motion Patterns in Dynamic Environments'. In: IEEE/RSJ International Conference on Intelligent Robots and Systems (IROS), Nov. 3, 2013, pp. 1196-1201.

International Search Report for PCT/SE2016/050670 dated Jan. 11, 2016.

Written Opinion of the International Searching Authority for PCT/SE2016/050670 dated Jan. 11, 2016.

Scania CV AB, Korean Patent Application No. 10-2018-7006045, Office Action, dated Jan. 30, 2019.

Scania CV AB, European Patent Application No. 16835539.4, Extended European Search Report, dated Feb. 15, 2019.

* cited by examiner

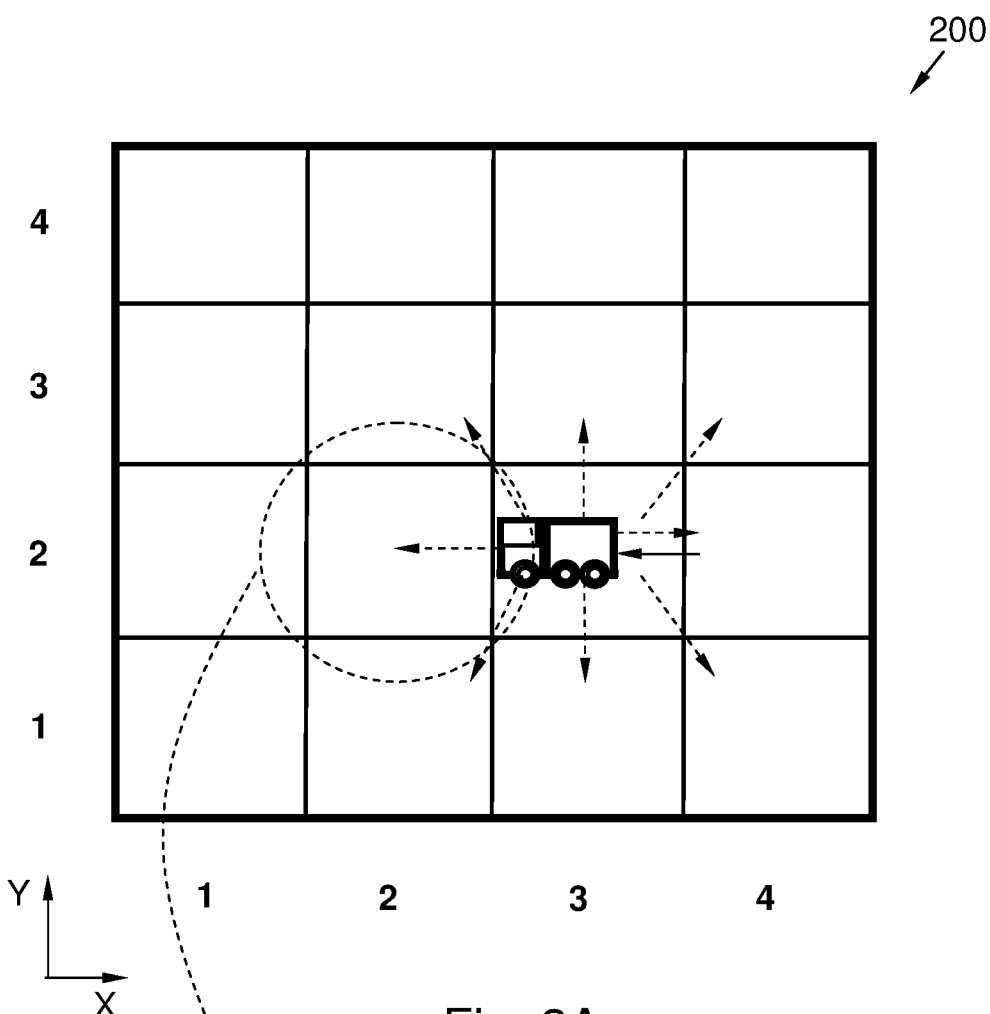
Fig. 2A
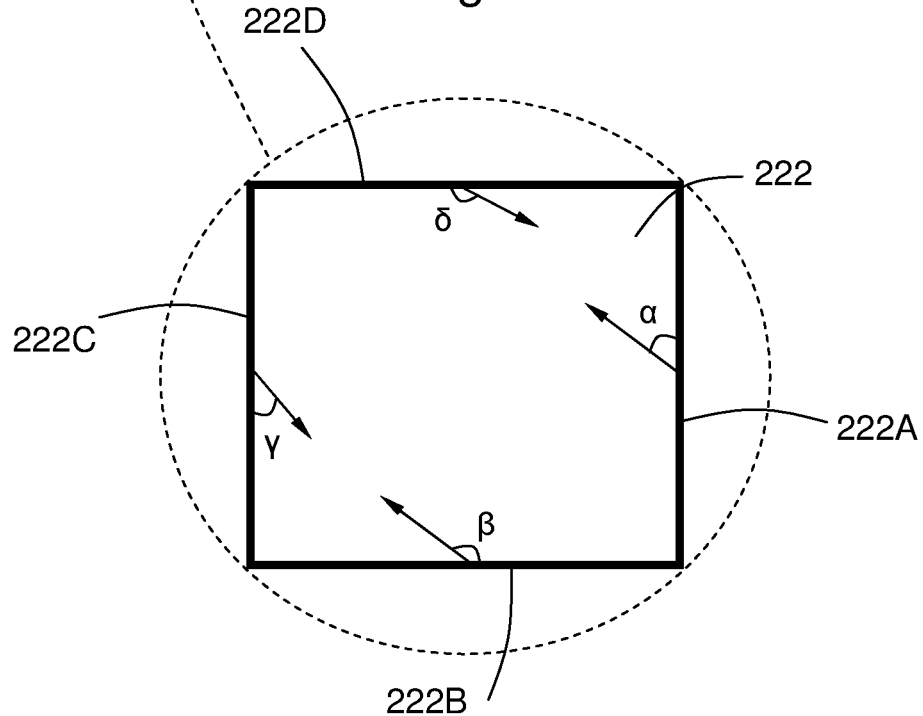

|     | A       | B        | C       | D       |
| --- | ------- | -------- | ------- | ------- |
| 211 | α = 35° | β = 172° | γ = 18° | δ = 24° |
| 212 | α = 45° | β = 90°  | γ = 9°  | δ = 118°|
| 213 | α = 82° | β = 47°  | γ = 110°| δ = 95° |
| 214 | α = 17° | β = 13°  | γ = 79° | δ = 3°  |

Fig. 2B

|     | A            | B            | C            | D            |
| --- | ------------ | ------------ | ------------ | ------------ |
| 211 | slope = -2°  | slope = -6°  | slope = 6°   | slope = 0°   |
| 212 | slope = 5°   | slope = 8°   | slope = 9°   | slope = 15°  |
| 213 | slope = -3°  | slope = 0°   | slope = -7°  | slope = -8°  |
| 214 | slope = 2°   | slope = -2°  | slope = -4°  | slope = 3°   |

Fig. 2C o----o predicted route of the vehicle

METHODS AND CONTROL UNITS FOR BUILDING A DATABASE AND FOR PREDICTING A ROUTE OF A VEHICLE

CROSS-REFERENCE TO RELATED APPLICATION(S)

This application is a national stage application (filed under 35 § U.S.C. 371) of PCT/SE2016/050670, filed Jun. 30, 2016 of the same title, which, in turn claims priority to Swedish Application No. 1551062-1, filed Aug. 11, 2015 of the same title; the contents of each of which are hereby incorporated by reference.

FIELD OF THE INVENTION

The present invention relates to units and methods for building a database, enabling prediction of a route of a vehicle, and estimating the length of the predicted route based on information stored in the database.

BACKGROUND OF THE INVENTION

Advanced driver functions in vehicles rely on accurate maps from which a prediction may be made about how the upcoming route of the vehicle will look like.

A map may be provided by a third party. Such map comprises information that make it possible to generate a prediction of how the road ahead of the vehicle will look like in terms of road slope. This prediction is of interest since certain functions rely on information about the upcoming road at a further distance than sensors such as radar or cameras can provide. Such functions can be used to save fuel by calculating an optimal velocity profile for the vehicle. By having such a map many other functions can be realized.

The maps used today are static, i.e. they are not updated once the vehicle is delivered. Thus vehicle maps may therefore lack coverage in certain countries where accurate map data is not available or just on smaller roads which are too unconomical to map.

Further, recently built roads may not be comprised on such map. Additionally, some particular environments may be very dynamical such as e.g. mines, building sites, deforestation areas, storage areas in a harbor, a load terminal or similar.

It is thus a problem for a driving control unit in a vehicle to get appropriate map information, corresponding to the geographical environment, in order to make correct predictions of the vehicle route.

Document DE102010042065 describes a method for combining route network data from a digital map with data of a digital terrain model. The network data represents coordinates and curvature of the road and the model represents geodetic height information. However, no prediction of the route of the vehicle may be made, in case there is no road on the digital map, or no digital map at all. Further the document does not discuss estimation of route distance using statistic data.

Documents US2010114474 and US2010324752 disclose methods for calculating surface elevation of the road in relation to distance of the route to be travelled by a vehicle. However, no prediction of the route of the vehicle may be made, in case there is no road on the digital map, or no digital map at all. Further the documents do not discuss estimation of route distance using statistic data.

Document EP2623932 discloses a method of creating a route of a vehicle using a grid net, where measurements are made at each grid of the net. However, no prediction of the route of the vehicle may be made, in case there is no road on the digital map, or no digital map at all.

Document JP3966097 discloses a vehicular road surface altitude estimation device that estimates the altitude of a travel route based on linear interpolation. However, no prediction of the route of the vehicle is made, in case there is no road on the digital map, or no digital map at all.

It may thereby be desired to be able to create and continuously update a map and provide a solution to the above discussed problems in connection with vehicle route prediction.

SUMMARY OF THE INVENTION

It is therefore an object of this invention to solve at least some of the above problems and improve route prediction of a vehicle.

This object and/or others are obtained by the methods and devices as set out in the appended claims.

According to a first aspect of the invention, this objective is achieved by a method for building a database, enabling prediction of a route of a vehicle, and estimating the length of the predicted route. The method comprises establishing a grid-based representation of a geographical landscape, comprising a plurality of cells. Also the method comprises determining current geographical position of the vehicle. The method further comprises detecting when the determined geographical position of the vehicle corresponds to a cell border of a cell in the established grid-based representation. Further the method also comprises determining a driving direction of the vehicle when passing the cell border for entering the cell. The methods also comprises storing the determined driving direction, associated with the cell border of the cell in the database.

According to a second aspect of the invention, this objective is achieved by a control unit in a vehicle. The control unit aims at building a database for enabling prediction of a route of a vehicle, and estimation of the length of the predicted route. The control unit is configured for establishing a grid-based representation of a geographical landscape, comprising a plurality of cells. Further the control unit is additionally configured for determining current geographical position of the vehicle. Also the control unit is further configured for detecting when the determined geographical position of the vehicle corresponds to a cell border of a cell in the established grid-based representation. The control unit is also configured for determining a driving direction of the vehicle when passing the cell border for entering the cell. In addition the control unit is also configured for storing the determined driving direction, associated with the cell border of the cell in the database.

According to a third aspect of the invention, this objective is achieved by a method for predicting a route of a vehicle, and estimating length of the predicted route. The method comprises determining current geographical position of the vehicle. Also the method further comprises detecting a stored cell border of a cell in a grid-based representation of a landscape, comprising a plurality of cells in a database, corresponding to the determined geographical position. Further the method comprises determining that the vehicle is entering the cell at the detected cell border of the cell. The method further comprises extracting a stored driving direction at the detected cell border of the cell from the database. The method additionally also comprises detecting a cell border of a neighbor cell to the cell, in the direction of the extracted stored driving direction at the detected cell border of the cell. Furthermore, the method also comprises repeating the steps of extracting the stored driving direction and detecting a cell border of a neighbor cell until a condition is fulfilled. The method in further addition also comprises predicting the route of the vehicle by creating a series of linear segments through the cells, bounded by the detected cell borders. Further the method in addition also comprises estimating the length of the predicted route of the vehicle by adding an estimated distance through each cell of the predicted route of the vehicle.

According to a fourth aspect of the invention, this objective is achieved by a control unit in a vehicle. The control unit aims at predicting a route of a vehicle, and estimating length of the predicted route. The control unit comprises determining current geographical position of the vehicle. Further the control unit comprises detecting a stored cell border of a cell in a grid-based representation of a landscape, comprising a plurality of cells in a database, corresponding to the determined geographical position. The control unit also comprises determining that the vehicle is entering the cell at the detected cell border of the cell. Further the control unit in addition comprises extracting a stored driving direction at the detected cell border of the cell from the database. Also the control unit comprises detecting a cell border of a neighbor cell to the cell, in the direction of the extracted stored driving direction at the detected cell border of the cell. The control unit furthermore comprises repeating the steps of extracting the stored driving direction and predicting the route of the vehicle until a condition is fulfilled. Further, the control unit also comprises predicting the route of the vehicle by creating a series of linear segments through the cells, bounded by the detected cell borders. The control unit also comprises estimating the length of the predicted route of the vehicle by adding an estimated distance through each cell of the predicted route of the vehicle.

Hereby, thanks to the disclosed aspects, route planning is simplified. A more accurate distance estimation of the road ahead of the vehicle is possible since it is approximated by a first order polynomial. The use of directions instead of counters allows the statics to be implemented with 50% less memory usage. Thus route prediction of the vehicle is improved.

Other advantages and additional novel features will become apparent from the subsequent detailed description.

BRIEF DESCRIPTION OF THE DRAWINGS

Embodiments of the invention will now be described in further detail with reference to the accompanying Figures, in which:

FIG. 2A illustrates a grid-based representation of a geographical landscape and directions associated with a cell border;

FIG. 2B illustrates an example of stored driving directions associated with different cell borders;

FIG. 2C illustrates an example of stored road slopes associated with different cell borders;

DETAILED DESCRIPTION OF THE INVENTION

Embodiments of the invention described herein are defined as methods and a control unit, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
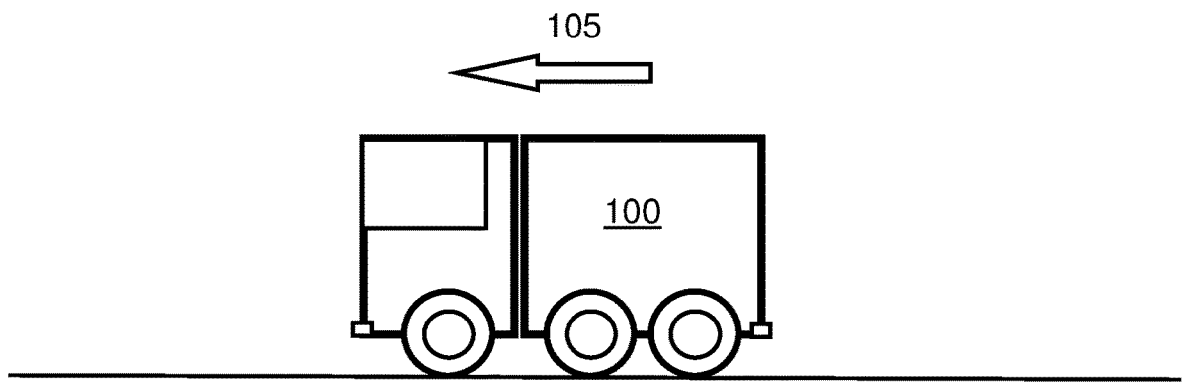
FIG. 1 illustrates a side view of a vehicle according to an embodiment.

FIG. 1A illustrates a scenario with a vehicle 100 driving in a driving direction 105. The vehicle 100 may be e.g. a truck, a bus, a van, a car, or any other similar type of vehicle with or without an attached trailer.

The vehicle 100 comprises a self-learning map which may be updated continuously, or at certain predetermined or configurable time intervals.

In some embodiments, such self-learning map system may be implemented by dividing the coverage area of the electronic map into small, equally sized area elements or cells. The entire coverage area then form a grid of many small cells. The cells may have any area covering format such as e.g. quadratic, rectangular, triangular, pentagonal, hexagonal, etc., or a combination of formats.

When the position of the vehicle 100 is registered inside a specific cell, or at a cell border of the cell, that cell is marked as a part of a road and various road attributes such as road slope may be assigned to it.

In order to use the recorded road slope, it may be stored associated with a segment of the predicted road ahead. The offset from the starting point to each segment with constant road slope may be detected and determined in order to determine where an inclination or declination of the road slope starts and ends, respectively. To reconstruct the road profile of the most probable path, the travelled distance through each cell may also be estimated. This produces an output in form of the road slope as a function of the travelled distance.

In order to generate a probable path statistics may be stored, concerning how the vehicle 100 has moved through each cell. One possible implementation solution comprises applying 16 counters, four for each possible side of entry into the cell. The four counters may represent a normalised value of the number of times a certain cell side has been exited through by the vehicle 100, or vehicles. The counters may be used to determine the most probable next cell to move into and thereby make a prediction of the vehicle route.

However, a disadvantage of the above described solution based on 16 counters of each cell is that it is not possible to calculate the travelled distance though each cell of the grid-based representation of the geographical landscape.

Even if an accurate estimation of the road slope along the upcoming road may be made with the above solution, there is an uncertainty about where a road slope or hill actually begins and ends. Such errors causes the performance of functions using the generated route prediction to deteriorate.

Thus, an improved approach may be applied in order to overcome the above stated disadvantages. In some embodiments, memory storage entities may be used to store information about the most probable entry/exit direction of each cell border of each cell. Thereby memory may be saved and a more accurate distance estimation may be made. This is achieved by storing a unique direction for each possible side of entry of the respective cell. This may be visualised as an arrow, pointing in the most likely direction of travel through the cell, as will be further discussed and illustrated in FIG. 2A.

Since the road slope is direction dependent, the slope may be stored for each side of entry of each respective cell. The different attributes of a cell is illustrated in FIG. 2A. The disclosed solution may produce a more accurate approximation of the travelled distance through the cell by using e.g. linear approximation.

The current geographical position and driving direction of the vehicle 100 is used as an initial value to start the prediction algorithm. If there is previously recorded information registered at the corresponding cell, the direction may be used to compute the trajectory through the cell. The point where the straight line is intersecting the border of the cell may be used as a starting point for the following cell. Cells may be traversed in this manner until the desired length of the horizon is reached or there are no more data available as will be further illustrated and discussed in FIG. 2E and FIG. 2F.

Thereby a more accurate distance estimation of the road ahead of the vehicle 100 is possible since it may be approximated by a first order polynomial. The use of directions at the cell borders instead of counters allows the statics to be implemented with 50% less memory usage.

FIG. 2A discloses a grid-based representation 200 of a horizontal geographical landscape, i.e. the road or other driving environment of the vehicle 100. The grid-based representation 200 comprises a plurality of cells 211, 212, 213, 214, 221, 222, 223, 224, 231, 232, 233, 234, 241, 242, 243, 244.

The vehicle 100 is currently in its way to enter one cell 222 in the grid-based representation 200, at a cell border 222A. The cell 222 has, when the cells 211, 212, . . . , 244 are quadratic or rectangular, four cell borders; 222A, 222B, 222C and 222D.

A driving direction is stored at each cell border 222A, 222B, 222C and 222D of the cell 222. Thereby a driving direction is determined and stored with an angle $\alpha$, $\beta$, $\gamma$, $\delta$ to a reference, such as the respective cell border 222A, 222B, 222C and 222D.

Thus the driving direction of the vehicle 100 may be stored when entering the cell border 222A, 222B, 222C and 222D of the cell 222. The driving direction may thus be updated each time the vehicle 100 enter the respective cell 211, 212, . . . , 244. The currently detected driving direction of the vehicle 100 when entering the cell 211, 212, . . . , 244 may be combined with the previously stored driving directions (if any) and then stored. The combination may be made by calculating a mean average value, or weighted average value according to different embodiments.

Once the area represented by a cell 211, 212, . . . , 244 has been traversed by the vehicle 100, the cell 211, 212, . . . , 244 may be assigned a value and may hence be seen as visited. When making a prediction of the future movement from the cell 211, 212, . . . , 244, the cells 211, 212, . . . , 244 on the edges of the first cell 211, 212, . . . , 244 may be studied in order to determine which of those has been visited before. By doing so a decision may be made concerning which cell 211, 212, . . . , 244 is the most probable one to be the next cell 211, 212, . . . , 244 to visit. If a cell 211, 212, . . . , 244 only has two additional neighbor cells 211, 212, . . . , 244 that have been visited next to itself, it is straightforward to determine the most probable path. This is the case since one of the two neighboring cells 211, 212, . . . , 244 represent the previous cell 211, 212, . . . , 244 and the other one the probable next cell 211, 212, . . . , 244 to visit. The most probable move in this case is thus to exit the current cell 211, 212, . . . , 244 into the neighbor cell 211, 212, . . . , 244 that the vehicle 100 did not enter through. However when noisy positioning signals, highways with multiple lanes and crossings are a reality in real world road networks, more sophisticated ways of predicting the most probable path may be an advantage. To be able to predict the future path of the vehicle 100, statistics thus may be stored in order to generate a prediction of the road ahead for the vehicle 100.

The statistics from previous passes in a cell 211, 212, . . . , 244 may be implemented in the form of arrows, pointing in the most common direction of movement through each cell 211, 212, . . . , 244. One direction through a cell 211, 212, . . . , 244 may not be enough for predicting the upcoming road, since it is possible to enter a cell 211, 212, . . . , 244 from any of its eight surrounding neighbor cells 211, 212, . . . , 244. To reduce the complexity and memory usage, a simplification regarding the transition between two cells 211, 212, . . . , 244 may be made in some embodiments. Such simplification may state that it is only possible to enter a cell 211, 212, . . . , 244 from one of the four neighbor cells 211, 212, . . . , 244 located in the North, South, East and West directions, in an example with quadratic cells 211, 212, . . . , 244 in a grid-based representation 200 oriented in compass direction.

The simplification may be reasonable in some embodiments since in practical applications it would be very unlikely to enter a cell 211, 212, . . . , 244 through a corner of the cell 211, 212, . . . , 244 because the area of contact is infinitely small. If two following position samples are located in the cells 211, 212, . . . , 244 diagonally next to each other, a linear interpolation may be made and any cells 211, 212, . . . , 244 that are intersected are considered as a part of the road. This linear interpolation may be conducted in order to find all cells 211, 212, . . . , 244 that have been crossed by the vehicle 100. To add some robustness to the system, the case where the interpolation gives more crossed cells 211, 212, . . . , 244 than possible, based on the maximum speed of the vehicle 100, may be disregarded according to some embodiments. The directions may be identified based on from which side A, B, C, D the cell 211, 212, . . . , 244 was entered.

This gives the individual cell 211, 212, . . . , 244 the theoretical possibility to represent a section of a unidirectional road, a semi directional road, a four-way intersection or similar situation.

Theoretically a wide variety of road attributes can be associated with certain road segments, i.e. cells 211, 212, ..., 244 stored in the map, i.e. the grid-based representation 200 of the reality. Such attributes may be e.g. speed limits, curvature, road slope, height profile and/or road type, for example. The road slope and/or height profile may be of interest when an optimal velocity profile is derived to reduce the fuel consumption.

Such road slope and/or height profile may either be generated from stored heights in a map database or by integrating the road slope over a distance in different embodiments. When a map containing altitude information is built while driving, the system will suffer from inaccuracies such as bias errors in the height signal from a navigation system in the vehicle 100. This may be overcome by storing the road grade instead of the height profile, however an additional issue arises. The slope of a road segment is dependent of the direction of movement while the height is not. The road slope may therefore be combined with an identifier of its associated direction. The extra data may be stored for every cells 211, 212, ..., 244 and therefore may be minimized in order to reduce memory storage volume. A simplification similar to the one concerning the directions may be made that limits the different road slopes to one in each of the North, South, East and West directions, in some embodiments.

FIG. 2B illustrates an example of how different driving directions may be stored associated with cell borders A, B, C, D of different cells 211, 212, ..., 244 of the grid-based representation 200.

The illustrated examples are non-limiting and merely comprises some arbitrary examples.

Furthermore, road slope direction and/or road slope values may be determined and stored associated with cell borders A, B, C, D of different cells 211, 212, ..., 244 of the grid-based representation 200, as illustrated and exemplified in FIG. 2C.

Figure 2D:
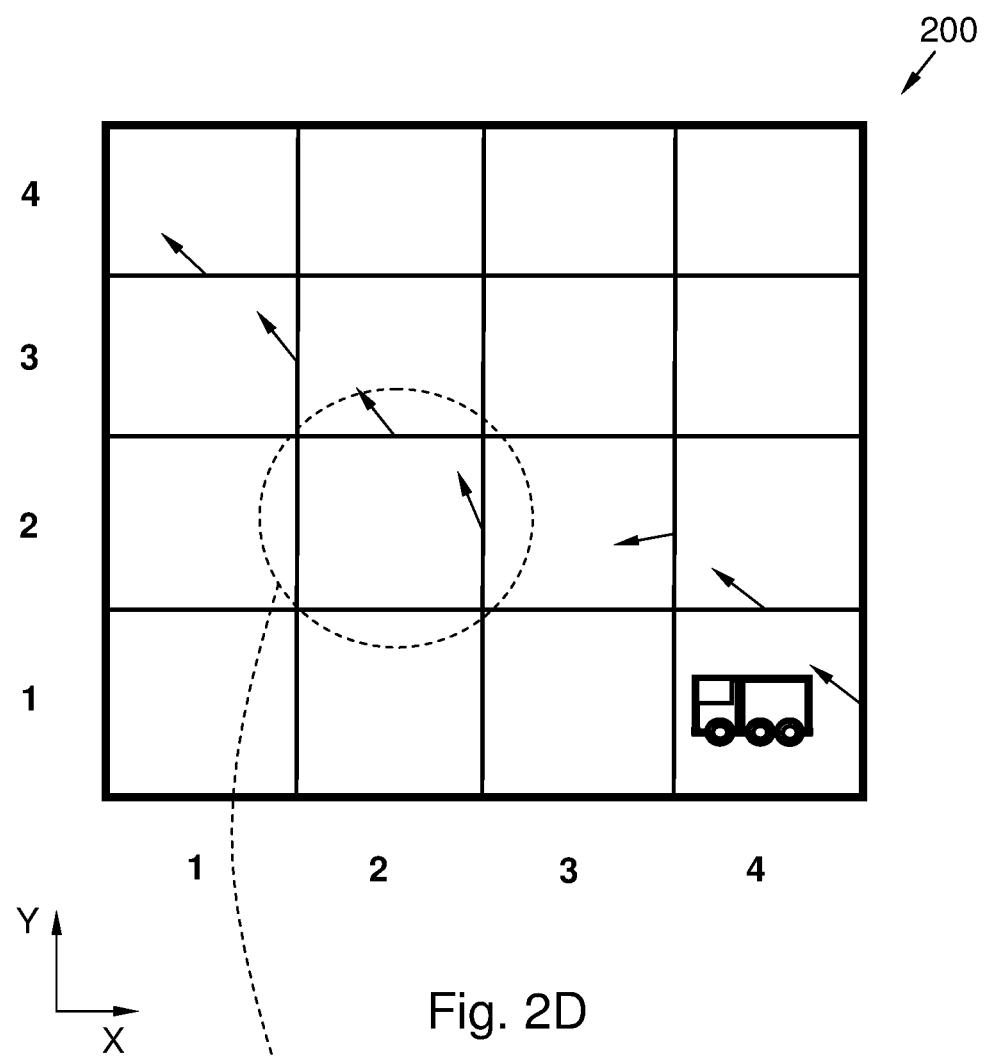
FIG. 2D illustrates a grid-based representation of a geographical landscape and directions associated with a cell border.
Figure 2D:
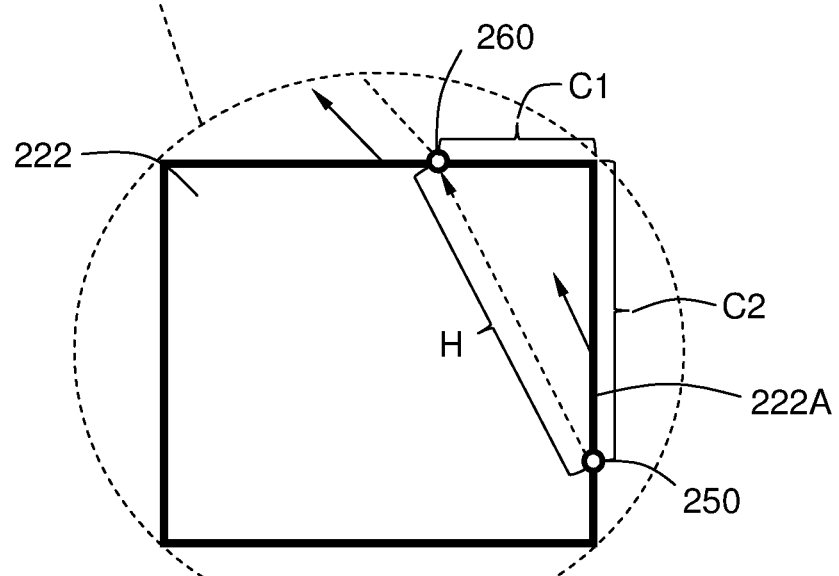

FIG. 2D illustrates the grid-based representation 200, where the driving direction of each cell border along a predicted route of the vehicle 100 is illustrated.

The purpose of the system developed is to predict how the road in front of a moving vehicle 100 looks like. The desired output may be a prediction of the profile of the upcoming road. This implies that the system may estimate or predict how the route that will be driven by the vehicle 100 will most probably look like. A system module may be used to generate a prediction of the road ahead of the vehicle 100 in some embodiments. The core of the system is an algorithm that determines how the vehicle 100 will most likely navigate between the buffered cells 211, 212, ..., 244 in the memory or database. With this information the distance of a predicted path can be estimated and the registered road slope can be associated to the predicted path. Since each of the four directions stored in a cell 211, 212, ..., 244 at each cell border A, B, C, D may be associated with a road slope, the road profile can be extracted together with the direction of the cell 211, 212, ..., 244. If it is possible to predict a 2 dimensional road, then the road grade profile may also automatically be determined for the prediction, given that the stored road grade is available.

In the magnified cell 222, the entrance point 250 of the vehicle 100 into the cell 222 is determined. By assuming that the vehicle 100 is passing the cell 222 in the direction associated with the cell border 222A through the cell, starting from the entrance point 250, the exit point 260 may be determined. It is to be noted that the exit point 260 also is the entrance point into the predicted next cell 232 of the route. The above procedure may then be repeated for a plurality of cells 211, 212, ..., 244 in order to predict the vehicle route.

Further, the distance passed in each cell 211, 212, ..., 244, like in cell 222 may be approximated. As the entrance point 250, the exit point 260 and the lengths of the cell sides A, B, C, D are known, the distances C1 and C2 are also known. Thus the distance H may be computed by using Pythagorean Theorem.

An issue that may arise when attempting to predict a road profile is that of creating an accurate distance estimation to associate the road grade to. It may in some embodiments be important for a predicted hill to not have an offset in terms of distance, since this may limit the performance of the functions using the output. The most basic approach to calculate the distance of the horizon is to simply approximate the trajectory with a series of straight lines between the midpoints of the visited cells 211, 212, ..., 244. This yields an uncertain distance estimation since some cells 211, 212, ..., 244 are traversed shorter than the cell width and some longer. A more accurate approach may be to calculate the distance that the vehicle 100 actually travelled through a cell 211, 212, ..., 244 and store the distance in the database. This value may then be incrementally updated every time the cell 211, 212, ..., 244 is traversed.

An issue related to this method is that the stored length in some cases may be different depending on where the cell 211, 212, ..., 244 is entered. This would for example be the case if a cell 211, 212, ..., 244 is located across a multi-lane highway where the highway crosses the cell 211, 212, ..., 244 at a 45 degree angle. Then the stored distance would vary depending on which lane was used. The approach actually implemented is utilizing the stored direction statistics. Given an entry point in the cell 211, 212, ..., 244 as well as the most likely direction of travel, the exit as well as the distance of travel may be estimated using a linear approximation as shown in FIG. 2D.

A difficulty related to creating the system may be developing an algorithm that can accurately create a predicted road segment from the stored data at the same time as being robust to errors in stored directions. The fundamental idea is to use the latest known position and bearing sample of the vehicle 100 as a starting point for creating a horizon from the stored cell information. This may be done by extending a straight line from the original position with the current bearing. When this line crosses into a new cell 211, 212, ..., 244 the stored data in the new cell 211, 212, ..., 244 is extracted and the directional information for the specific entry side may be used to give the line a new direction. The line will then be extended until crossing a new cell border A, B, C, D and the procedure will be repeated.

In this way a long piecewise linear road prediction may be created. The corresponding road grade data may be extracted at the same time in some embodiments and the distance in each cell 211, 212, ..., 244 along the route of the vehicle 100 may be calculated. The procedure of creating a predicted road segment is displayed in FIG. 2E.

Figure 2E:
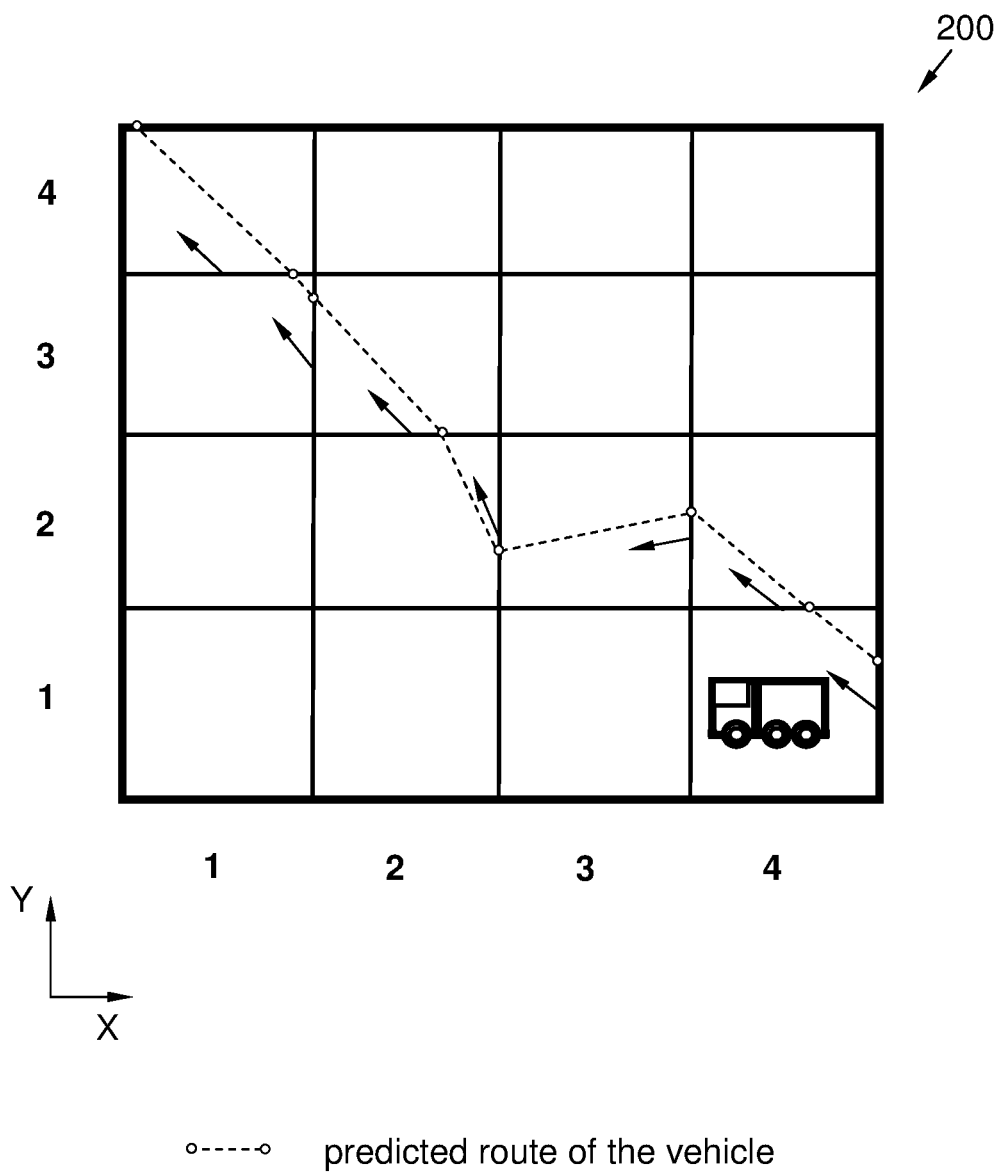
FIG. 2E illustrates a grid-based representation of a geographical landscape, directions associated with a cell border and a predicted vehicle route.

It may be noted that no starting point of the directions is stored but only the directions themselves, associated with the entrance cell border A, B, C, D. The arrows on the left hand side in FIG. 2E are all placed in the middle of their respective entry side A, B, C, D for illustrative purposes. The entry point 250 of a cell 211, 212, ..., 244 may be determined from where the horizon being generated intersects the cell 211, 212, ..., 244 boundary. The stored direction may then be used to make the horizon continue from this point and find the next exit. The horizon generation may then proceed until one of three events occurs: a predefined maximum length of the horizon is obtained; the algorithm cannot find any probable continuation of the predicted road and/or the predicted road hits the edge of the available buffer around the vehicle 100.

The case described above is an embodiment where all necessary information is stored as expected. This is however not always the case since an offset in the starting point of the algorithm or disturbances in the recorded directions might result in a predicted horizon crossing into a previously not visited cells 211, 212, . . . , 244 and consequently not being able to find the necessary directional data. Instead of terminating the prediction and concluding that a longer prediction cannot be achieved, some alternative approaches may be used to increase the robustness and predict longer horizons, according to some embodiments.

The first solution to the problem may be to investigate an alternative exit from the last valid cell 211, 212, . . . , 244. Depending on the direction data stored of the last valid cell 211, 212, . . . , 244, an alternative candidate cell 211, 212, . . . , 244 may be chosen and investigated. This is generally the cell 211, 212, . . . , 244 closest to the expected exit point 260 of the last valid cell 211, 212, . . . , 244. If the data required to proceed with the horizon generation can be found in the alternate cell 211, 212, . . . , 244 the generated horizon may be modified to enter into this cell 211, 212, . . . , 244 instead and the horizon generation continues in the original manner from the alternative cell 211, 212, . . . , 244. This alternative embodiment may catch the most cases when the horizon segment is terminated to early. If the attempt is unsuccessful, a pattern of alternative cells 211, 212, . . . , 244 may be sequentially considered as candidates to be used in the horizon. Three candidate cells 211, 212, . . . , 244 may be evaluated if the first choice of next cells 211, 212, . . . , 244 for the horizon is unavailable. The first choice of next cells 211, 212, . . . , 244 along with the three candidates may be described in turn in the list below.
1. The cell 211, 212, . . . , 244 that shares the cell border A, B, C, D where the exit point 260 is calculated to be located.
2. The cell 211, 212, . . . , 244 that is located alongside the last valid cell 211, 212, . . . , 244 and is the closest to the calculated exit point 260. 3. The cell 211, 212, . . . , 244 that is located alongside the first choice of next cell 211, 212, . . . , 244 and is closest to the exit point 260. 4. The other cell 211, 212, . . . , 244 that is located alongside the first choice of next cell 211, 212, . . . , 244 but not is the closest to the exit point 260. A complementary approach according to yet an alternative embodiment, in order to find the problem of finding a longer horizon may be to backtrack the last steps in the found horizon and look for a different possible route. This approach may be illustrated as a decision tree were different pixels are represented by nodes which may be traversed in order to achieve the longest horizon. The purpose of this approach is to eliminate the case when the found horizon represents a dead end. The reason for such behavior may be an actual dead end or be caused by incorrect data stored in the map. This may be the case when the vehicle 100 approaches e.g. a T- or Y-junction. If both of the roads are visited several times each the directional information might indicate that the most probable direction of travel lies in the middle of the two roads where there actually is no road. Normally in this case the cell 211, 212, . . . , 244 that lies between the two roads has not been not visited and the algorithm will chose one of the two real roads. However if a cell 211, 212, . . . , 244 that lies outside the two roads has been assigned a value due to incorrect positional data being stored earlier a "phantom road" might be detected according to some embodiments. That is a road that does not exist in reality. If this non actual road only has a few cells 211, 212, . . . , 244 registered in its direction, it would be possible to step back a few cells 211, 212, . . . , 244 to find an alternate road which in this case would be one of the two real roads in the crossing. In order to make the specific in-cell calculations standardized a standard cell 211, 212, . . . , 244 may be used for all operations on this level. This means that independent of the side A, B, C, D on which the cell 211, 212, . . . , 244 is entered, the calculations within the cell 211, 212, . . . , 244 are conducted in the same manner. The entry side A, B, C, D of the cell 211, 212, . . . , 244 is defined as the base of the cell 211, 212, . . . , 244.

From this side A, B, C, D, a relative coordinate system may be defined in which the entry position 250 and exit position 260 are defined. A relative angle $\alpha$, $\beta$, $\gamma$, $\delta$ defined from the base line may be used to describe the direction of travel. This makes it possible to calculate a distance through the cell 211, 212, . . . , 244 and determine the exit point 260 of the cell 211, 212, . . . , 244 independently of the entry side A, B, C, D of the cell 211, 212, . . . , 244. In order to integrate this relative cell 211, 212, . . . , 244 with its corresponding values and the calculations in the real map, a transformation from the absolute coordinates into relative coordinates is necessary. The transformation may be seen as a simple rotation of the cell 211, 212, . . . , 244. It is rotated so that the entry side A, B, C, D of the cell 211, 212, . . . , 244 is the base. Calculations are conducted and the results is transformed back into absolute values and stored in that format.

Figure 2F:
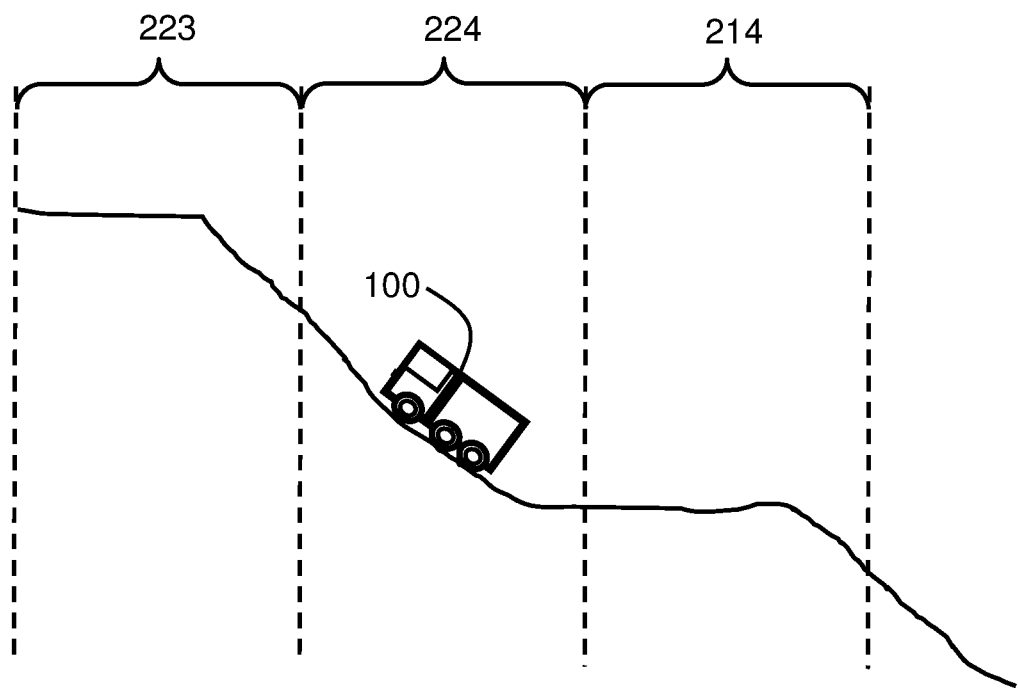
FIG. 2F illustrates an example of road slopes when the vehicle is passing three cells of the grid-based representation.
Figure 2F:
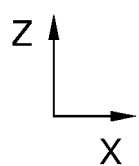

FIG. 2F illustrates an example of the topographical differences the vehicle 100 will experience when passing three cells 214, 224 and 223, in an arbitrary example. By combining the past distance in the horizontal plane with the curvature in the vertical plane, the distance of the predicted route of the vehicle 100 may be estimated, in some embodiments.

Figure 3:
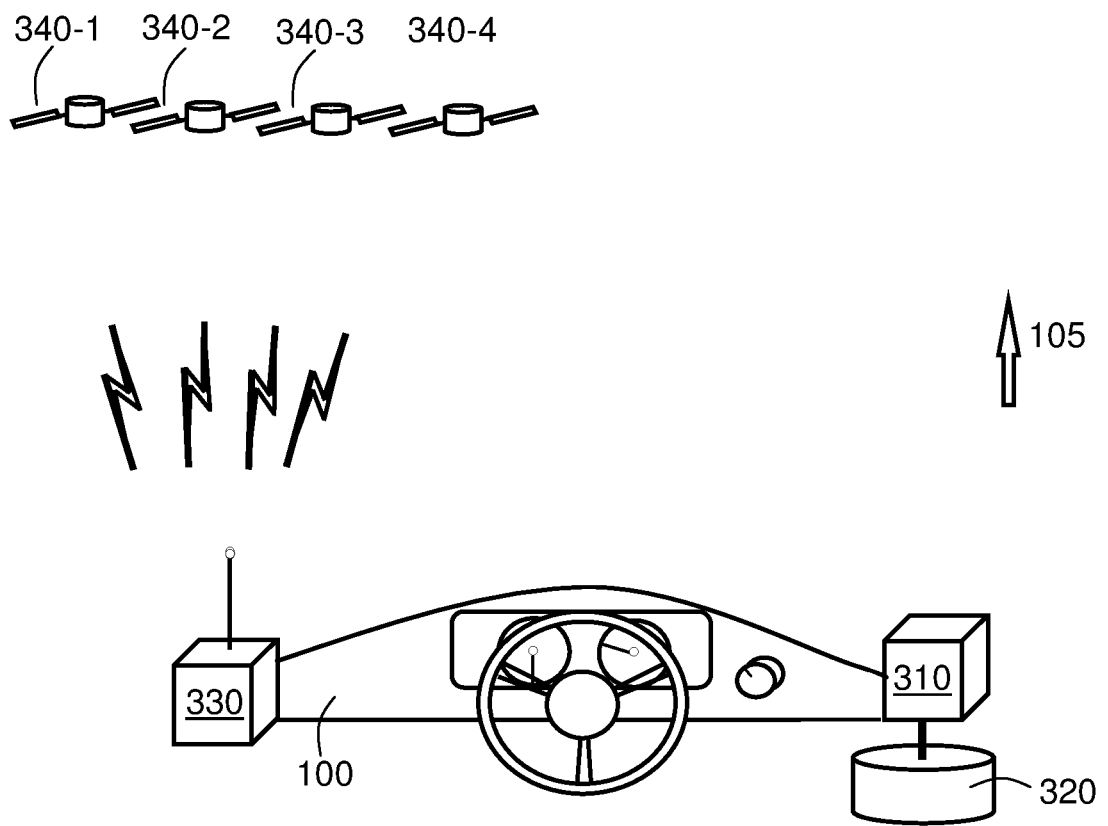
FIG. 3 illustrates an example of a vehicle interior according to an embodiment.

FIG. 3 presents a vehicle interior, according to an embodiment, illustrating an example of how the previous scenario may be perceived by the driver of the vehicle 100 when situated at any arbitrary position along the route.

A control unit 310 may be configured for predicting a route for the vehicle 100, from a current position of the vehicle 100, to a destination. The control unit 310 may comprise, or be connected to a database 320, which database 320 may comprise data associated with geographical positions. In the illustrated embodiment, the control unit 310 and the database 320 are comprised within the vehicle 100. However, in other embodiments, another placing of the control unit 310 and/or the database 320 may be made, such as for example in a vehicle external structure, accessible via a wireless communication interface.

Such wireless communication may comprise or be based on e.g. a Vehicle-to-Vehicle (V2V) signal, or any other wireless signal based on, or at least inspired by wireless communication technology such as Wi-Fi, Ultra Mobile Broadband (UMB), Wireless Local Area Network (WLAN), Bluetooth (BT), or infrared transmission to name but a few possible examples of wireless communications.

The geographical position of the vehicle 100 may be determined by a positioning device 330 in the vehicle 100, which may be based on a satellite navigation system such as the Navigation Signal Timing and Ranging (Naystar) Global Positioning System (GPS), Differential GPS (DGPS), Galileo, GLONASS, or the like.

The geographical position of the positioning device 330, (and thereby also of the vehicle 100) may be made continuously with a certain predetermined or configurable time intervals according to various embodiments.

Positioning by satellite navigation is based on distance measurement using triangulation from a number of satellites 340-1, 340-2, 340-3, 340-4. In this example, four satellites 340-1, 340-2, 340-3, 340-4 are depicted, but this is merely an example. More than four satellites 340-1, 340-2, 340-3, 340-4 may be used for enhancing the precision, or for creating redundancy. The satellites 340-1, 340-2, 340-3, 340-4 continuously transmit information about time and date (for example, in coded form), identity (which satellite 340-1, 340-2, 340-3, 340-4 that broadcasts), status, and where the satellite 340-1, 340-2, 340-3, 340-4 are situated at any given time. The GPS satellites 340-1, 340-2, 340-3, 340-4 sends information encoded with different codes, for example, but not necessarily based on Code Division Multiple Access (CDMA). This allows information from an individual satellite 340-1, 340-2, 340-3, 340-4 distinguished from the others' information, based on a unique code for each respective satellite 340-1, 340-2, 340-3, 340-4. This information can then be transmitted to be received by the appropriately adapted positioning device comprised in the vehicles 100.

Distance measurement can according to some embodiments comprise measuring the difference in the time it takes for each respective satellite signal transmitted by the respective satellites 340-1, 340-2, 340-3, 340-4 to reach the positioning device 330. As the radio signals travel at the speed of light, the distance to the respective satellite 340-1, 340-2, 340-3, 340-4 may be computed by measuring the signal propagation time.

The positions of the satellites 340-1, 340-2, 340-3, 340-4 are known, as they continuously are monitored by approximately 15-30 ground stations located mainly along and near the earth's equator. Thereby the geographical position, i.e. latitude and longitude, of the vehicle 100 may be calculated by determining the distance to at least three satellites 340-1, 340-2, 340-3, 340-4 through triangulation. For determination of altitude, signals from four satellites 340-1, 340-2, 340-3, 340-4 may be used according to some embodiments.

Having determined the geographical position of the positioning device 330 (or in another way), it may be presented on a map, a screen or a display device where the position of the vehicle 100 may be marked.

In some embodiments, the geographical position of the vehicle 100, the predicted route of the vehicle 100 and other possible information related to the route planning, may be displayed on an interface unit. The interface unit may comprise a dashboard, a screen, a display, or any similar device.

Figure 4:
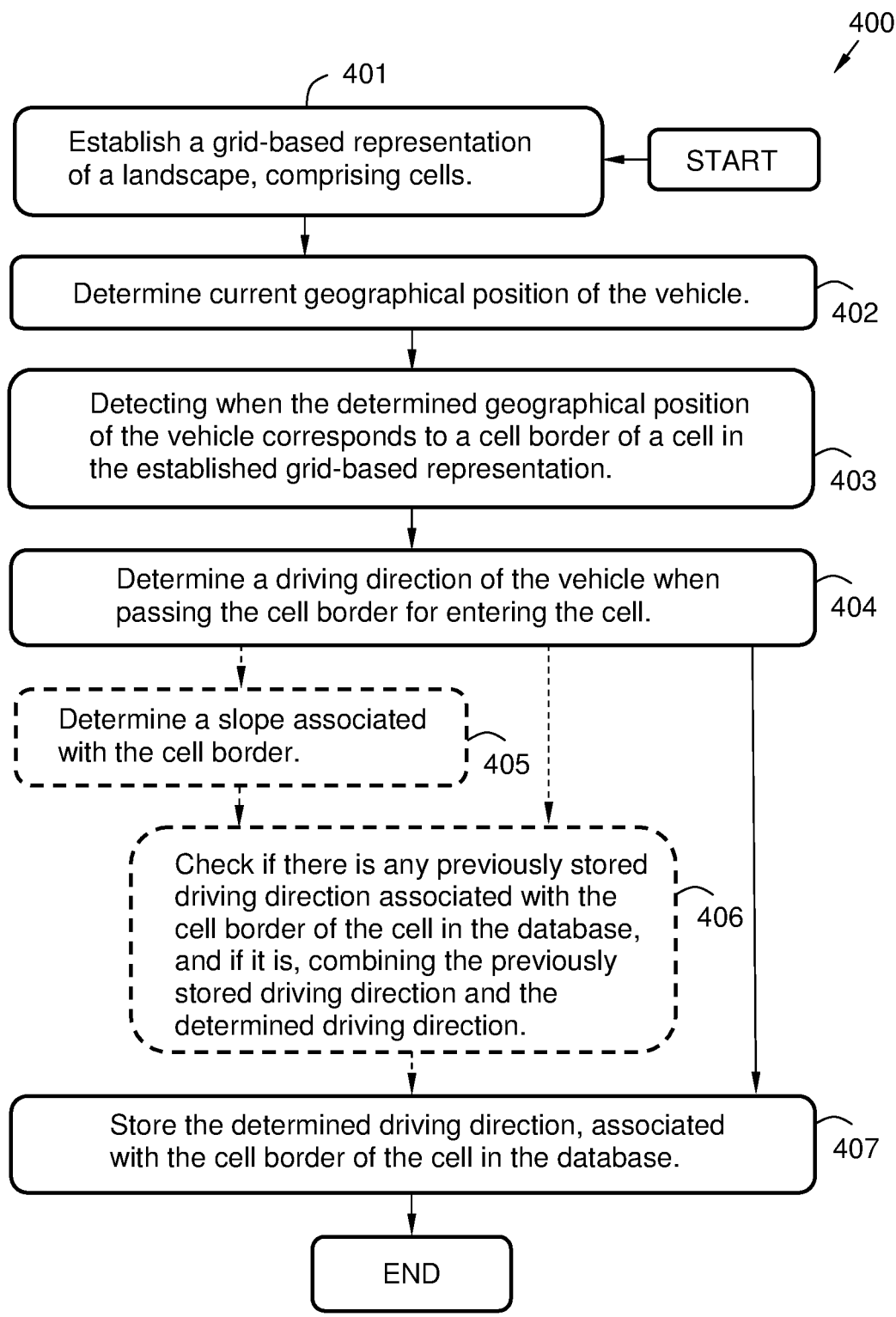
FIG. 4 is a flow chart illustrating an embodiment of a method.

FIG. 4 illustrates an example of a method 400 according to an embodiment. The flow chart in FIG. 4 shows the method 400, for building a database 320, enabling prediction of a route of a vehicle 100, and estimating the length of the predicted route.

The vehicle 100 may be any arbitrary kind of means for conveyance, such as a truck, a bus, a car, or similar. The vehicle may be driven by a driver, or be autonomous in different embodiments.

In order to correctly be able to build the database 320, the method 400 may comprise a number of steps 401-407. However, some of these steps 401-407 may be performed solely in some alternative embodiments, like e.g. step 405-406. Further, the described steps 401-407 may be performed in a somewhat different chronological order than the numbering suggests. Step 402 may be performed before step 401 for example in some embodiments. The method 400 may comprise the subsequent steps:

Step 401 comprises establishing a grid-based representation 200 of a geographical landscape, comprising a plurality of cells 211, 212, . . . , 244.

Step 402 comprises determining the current position of the vehicle 100.

The current vehicle position may be determined by a geographical positioning device 330, such as e.g. a GPS. However, the current position of the vehicle 100 may alternatively be detected and registered by the driver of the vehicle 100.

Step 403 comprises detecting when the determined 402 geographical position of the vehicle 100 corresponds to a cell border 222A of a cell 222 in the established 401 grid-based representation 200.

Step 404 comprises determining a driving direction of the vehicle 100 when passing the cell border 222A for entering the cell 222.

Step 405 which may be performed only in some particular embodiments, comprises determining a slope associated with the cell border 222A.

The slope associated with the cell border 222A may be e.g. an average slope of the cell 222, an average slope of the cell border 222A, or the determined slope at the current segment of the cell border 222A, in different embodiments.

Furthermore, according to some embodiments, it may be checked if there is any previously stored slope associated with the cell border 222A of the cell 222 in the database 320, and if it is, the previously stored value or values may be combined with the determined slope and stored associated with the cell border 222A of the cell 222 in the database 320. in some such embodiments, the combination of the previously stored slope and the currently determined 405 slope may be made by computing a weighted mean value, giving the currently determined 404 slope a higher weight than the previously stored slope.

Step 406 which may be performed only in some particular embodiments, comprises checking if there is any previously stored driving direction associated with the cell border 222A of the cell 222 in the database 320, and if it is, combining the previously stored driving direction and the determined 404 driving direction, and wherein the combined driving direction is stored 407 associated with the cell border 222A of the cell 222 in the database 320.

The combination of the previously stored driving direction and the currently determined 404 driving direction may be made by computing a weighted mean value, giving the currently determined 404 driving direction a higher weight than the previously stored driving direction, in some embodiments.

Step 407 comprises storing the determined driving direction, associated with the cell border 222A of the cell 222 in the database 320.

Figure 5:
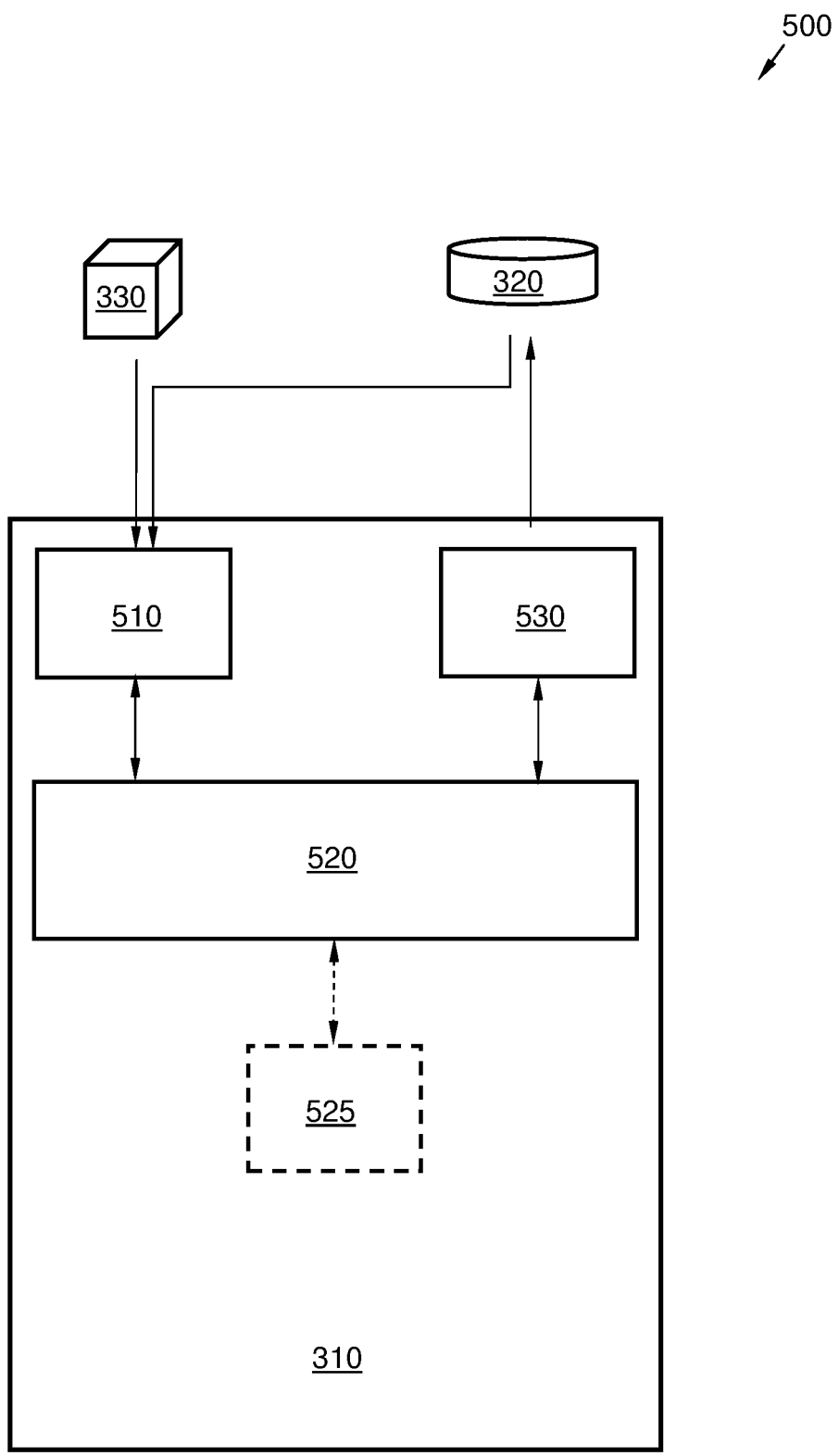
FIG. 5 is an illustration depicting a control unit and system according to an embodiment.

FIG. 5 illustrates an embodiment of a system 500 for building a database 320, enabling prediction of a route of a vehicle 100, and estimation of the length of the predicted route.

The system 500 comprises a control unit 310 in a vehicle 100, and a geographical positioning device 330 and a database 320. The control unit 310 may perform at least some of the previously described steps 401-407 according to the method 400 described above and illustrated in FIG. 4.

The control unit 310 is configured for building a database 320 and thereby enable prediction of a route of a vehicle 100, and estimation of the length of the predicted route. The control unit 310 is further configured for establishing a grid-based representation 200 of a geographical landscape, comprising a plurality of cells 211, 212, . . . , 244. Also, the control unit 310 is additionally configured for determining current geographical position of the vehicle 100. In addition, the control unit 310 is also configured for detecting that the determined geographical position of the vehicle 100 corresponds to a cell border 222A of a cell 222 in the established grid-based representation 200. Further, the control unit 310 is configured for determining a driving direction of the vehicle 100 when passing the cell border 222A for entering the cell 222. Also, the control unit 310 is configured for storing the determined driving direction, associated with the cell border 222A of the cell 222 in the database 320.

In some embodiments, the control unit 310 may be further configured for determining a slope and/or other road attribute related to the road, associated with the cell border 222A.

Further, according to some embodiments, the control unit 310 may also be configured for storing the determined slope associated with the cell border 222A of the cell 222 in the database 320. In some embodiments, a weighted mean value of the determined slope may be computed, giving the currently determined slope a higher weight than the previously stored slope.

The control unit 310 may further be configured for checking if there is any previously stored driving direction associated with the cell border 222A of the cell 222 in the database 320, and if it is, combining the previously stored driving direction and the determined driving direction, and wherein the combined driving direction is stored associated with the cell border 222A of the cell 222 in the database 320.

Also, the control unit 310 may be configured for combining the previously stored driving direction and the currently determined driving direction by computing a weighted mean value, giving the currently determined driving direction a higher weight than the previously stored driving direction, in some embodiments.

In some embodiments, the control unit 310 may be comprised in the vehicle 100. However, in some other alternative embodiments, the control unit 310 may be comprised in a vehicle external structure.

The control unit 310 may comprise a processor 520 configured for performing at least some of the previously described steps 401-407 according to the method 400, in some embodiments.

Such processor 520 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

The control unit 310 may further comprise a receiving circuit 510 configured for receiving a signal from the positioning device 330, and/or the database 310 in different embodiments.

Furthermore, the control unit 310 may comprise a memory 525 in some embodiments. The optional memory 525 may comprise a physical device utilized to store data or programs, i.e., sequences of instructions, on a temporary or permanent basis. According to some embodiments, the memory 525 may comprise integrated circuits comprising silicon-based transistors. The memory 525 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 310 may comprise a signal transmitter 530. The signal transmitter 530 may be configured for transmitting signals to be received by the database 320.

Furthermore, the control unit 310 is configured for predicting a route of a vehicle 100, and estimating length of the predicted route. Further the control unit 310 is configured for determining current geographical position of the vehicle 100. Also the control unit 310 is configured for detecting a stored cell border 222A of a cell 222 in a grid-based representation 200 of a landscape, comprising a plurality of cells 211, 212, . . . , 244 in a database 320, corresponding to the determined geographical position. In addition, the control unit 310 is further configured for determining when the vehicle 100 is entering the cell 222 at the detected cell border 222A of the cell 222. Also, the control unit 310 is configured for extracting a stored driving direction at the detected cell border 222A of the cell 222 from the database 320. Furthermore, the control unit 310 is also configured for detecting a cell border 232B of a neighbor cell 232 to the cell 222, in the direction of the extracted stored driving direction at the detected cell border 222A of the cell 222. The control unit 310 is furthermore configured for repeating the steps of extracting the stored driving direction and predicting the route of the vehicle 100 until a condition is fulfilled. Also, the control unit 310 is configured for predicting the route of the vehicle 100 by creating a series of linear segments through the cells 211, 212, . . . , 244, bounded by the detected cell borders 222A, 232B. The control unit 310 is configured for estimating the length of the predicted route of the vehicle 100 by adding an estimated distance through each cell 211, 212, . . . , 244 of the predicted route of the vehicle 100.

The previously described steps 401-407 to be performed in the control unit 310 may be implemented through the one or more processors 520 within the control unit 310, together with computer program product for performing at least some of the functions of the steps 401-407. Thus a computer program product, comprising instructions for performing the steps 401-407 in the control unit 310 may perform the method 400 comprising at least some of the steps 401-407 for building a database 320, enabling prediction of a route of a vehicle 100, and estimation of the length of the predicted route, when the computer program is loaded into the one or more processors 520 of the control unit 310.

The computer program product mentioned above may be provided for instance in the form of a data carrier carrying computer program code for performing at least some of the step 401-407 according to some embodiments when being loaded into the one or more processors 520 of the control unit 310. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the control unit 310 remotely, e.g., over an Internet or an intranet connection.

Figure 6:
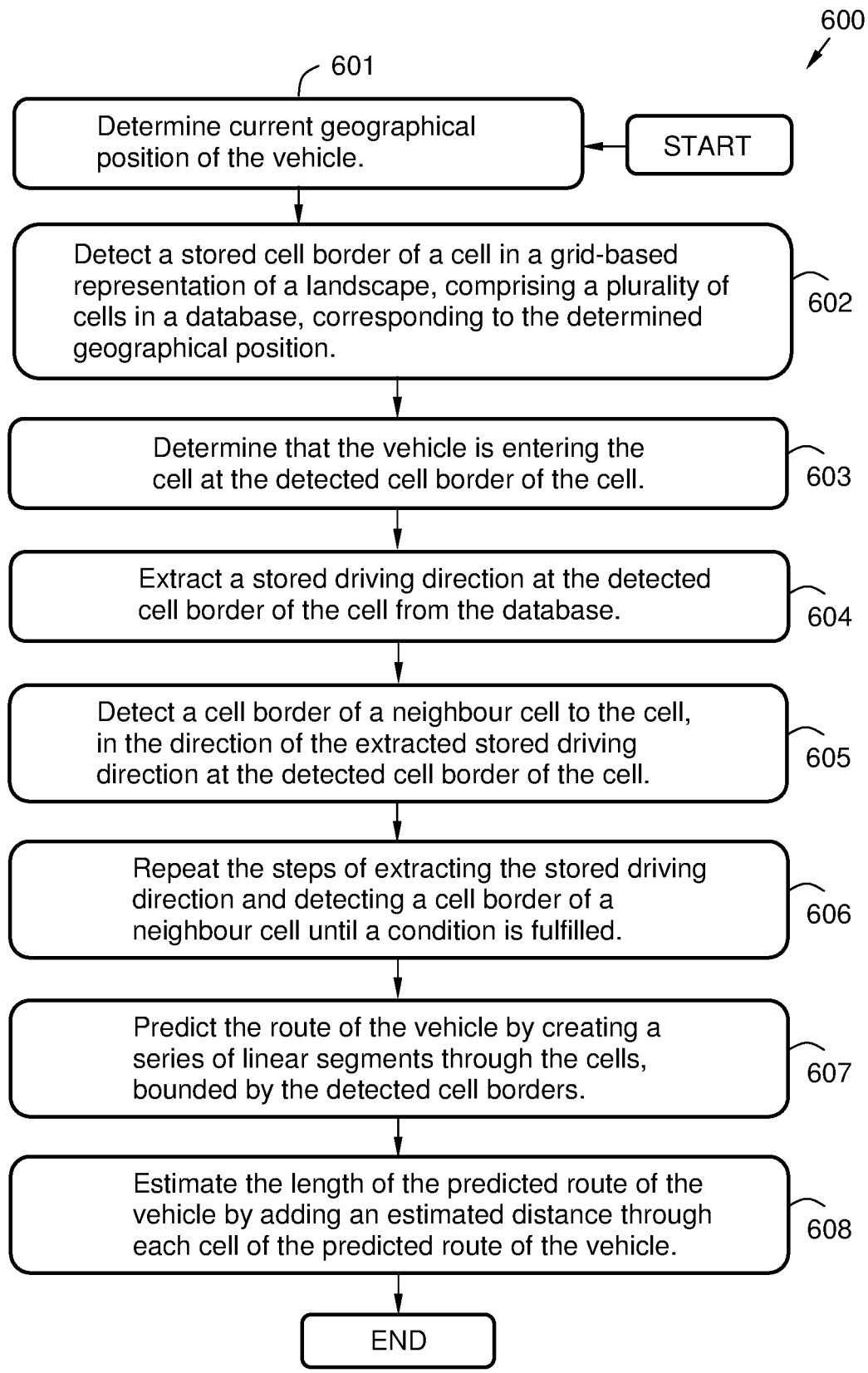
FIG. 6 is a flow chart illustrating an embodiment of a method.

FIG. 6 illustrates an example of a method 600 according to an embodiment. The flow chart in FIG. 6 shows the method 600, for predicting a route of a vehicle 100, and estimating length of the predicted route.

The route may be predicted based on a database 320, established e.g. by the previously described method 400 for building a database 320, enabling prediction of a route of a vehicle 100, and estimating the length of the predicted route.

The vehicle 100 may be any arbitrary kind of means for conveyance, such as a truck, a bus, a car, or similar. The vehicle may be driven by a driver, or be autonomous in different embodiments.

In order to correctly be able to predict the vehicle route, the method 600 may comprise a number of steps 601-608. However, some of these steps 601-608 may be performed solely in some alternative embodiments. Further, the described steps 601-608 may be performed in a somewhat different chronological order than the numbering suggests. Step 602 may be performed before step 601 for example in some embodiments. The method 600 may comprise the subsequent steps:

Step 601 comprises determining current geographical position of the vehicle 100.

The current vehicle position may be determined by a geographical positioning device 330, such as e.g. a GPS. However, the current position of the vehicle 100 may alternatively be detected and registered by the driver of the vehicle 100.

Step 602 comprises detecting a stored cell border 222A of a cell 222 in a grid-based representation 200 of a landscape, comprising a plurality of cells 211, 212, . . . , 244 in a database 320, corresponding to the determined 601 geographical position.

Step 603 comprises determining that the vehicle 100 is entering the cell 222 at the detected 602 cell border 222A of the cell 222.

Step 604 comprises extracting a stored driving direction at the detected 602 cell border 222A of the cell 222 from the database 320.

Step 605 comprises detecting a cell border 232B of a neighbor cell 232 to the cell 222, in the direction of the extracted 604 stored driving direction at the detected cell border 222A of the cell 222.

Step 606 comprises repeating the steps of extracting 604 the stored driving direction and detecting 605 a cell border 232B of a neighbor cell 232 until a condition is fulfilled.

Step 607 comprises predicting the route of the vehicle 100 by creating a series of linear segments through the cells 211, 212, . . . , 244, bounded by the detected 605 cell borders 222A, 232B.

Step 608 comprises estimating the length of the predicted 607 route of the vehicle 100 by adding an estimated distance through each cell 211, 212, . . . , 244 of the predicted 607 route of the vehicle 100.

In some embodiments, the estimation of the length of the predicted 607 route is performed by estimating a point of entrance 250 and a point of exit 260 of each cell 211, 212, . . . , 244 along the predicted 607 route, wherein the point of exit is situated in the extracted 604 driving direction associated with the cell border 222A of the point of entrance 250 of the cell 222, calculating the length of the distance between the point of entrance 250 and the point of exit 260 for each of the cells 211, 212, . . . , 244, and adding the calculated lengths to each other.

The driver of the vehicle 100 may be informed about the estimated 608 length of the predicted 607 route via an app, presented e.g. in a mobile device of the driver such as a mobile phone, computer, computer tablet or similar device.

The information may however be provided to the driver via a display in the vehicle 100, via a loud speaker in the vehicle 100 or similar device in different embodiments.

The previously described steps 601-608 to be performed in the control unit 310 may be implemented through the one or more processors 520 within the control unit 310, together with computer program product for performing at least some of the functions of the steps 601-608. Thus a computer program product, comprising instructions for performing the steps 601-608 in the control unit 310 may perform the method 600 comprising at least some of the steps 601-608 for predicting a route of a vehicle 100, and estimating length of the predicted route, when the computer program is loaded into the one or more processors 520 of the control unit 310.

The computer program product mentioned above may be provided for instance in the form of a data carrier carrying computer program code for performing at least some of the step 601-608 according to some embodiments when being loaded into the one or more processors 520 of the control unit 310. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the control unit 310 remotely, e.g., over an Internet or an intranet connection.

The terminology used in the description of the embodiments as illustrated in the accompanying drawings is not intended to be limiting of the described methods 400, 600; the control unit 310; the computer program and/or the vehicle 100, comprising a control unit 310. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A computer implemented method for building a database, enabling prediction of a route of a vehicle, and estimating the length of the predicted route, wherein the method comprises, via one or more computer processors:

establishing a grid-based representation of a geographical landscape, comprising a plurality of cells;

determining current geographical position of the vehicle;

detecting when the determined geographical position of the vehicle corresponds to a cell border of a cell in the established grid-based representation;

determining a driving direction of the vehicle and an angle of the vehicle relative to a reference when the vehicle passes the cell border for entering the cell; and storing the determined driving direction and angle, associated with the cell border of the cell in the database.

2. A computer implemented method for building a database, enabling prediction of a route of a vehicle, and estimating the length of the predicted route, wherein the method comprises, via one or more computer processors:
   establishing a grid-based representation of a geographical landscape, comprising a plurality of cells;
   determining current geographical position of the vehicle;
   detecting when the determined geographical position of the vehicle corresponds to a cell border of a cell in the established grid-based representation;
   determining a driving direction of the vehicle when passing the cell border for entering the cell;
   storing the determined driving direction, associated with the cell border of the cell in the database;
   determining a slope associated with the cell border; and
   storing the determined slope associated with the cell border of the cell in the database.

3. The method according to claim 1, further comprising:
   checking if there is any previously stored driving direction associated with the cell border of the cell in the database, and if it is, combining the previously stored driving direction and the determined driving direction, and wherein the combined driving direction is stored associated with the cell border of the cell in the database.

4. The method according to claim 3, wherein the combination of the previously stored driving direction and the currently determined driving direction is made by computing a weighted mean value, giving the currently determined driving direction a higher weight than the previously stored driving direction.

5. A control unit, for building a database, enabling prediction of a route of a vehicle, and estimation of the length of the predicted route, wherein the control unit comprises:
   at least one processor;
   a non-transitory computer readable medium; and
   a computer program product comprising computer program code stored on the non-transitory computer-readable medium readable by a computer, said computer program product comprising computer instructions to cause one or more computer processors to perform the following operations:
      establishing a grid-based representation of a geographical landscape, comprising a plurality of cells;
      determining current geographical position of the vehicle;
      detecting that the determined geographical position of the vehicle corresponds to a cell border of a cell in the established grid-based representation;
      determining a driving direction of the vehicle and an angle of the vehicle relative to a reference when the vehicle passes the cell border for entering the cell; and
      storing the determined driving direction and angle, associated with the cell border of the cell in the database.

6. A computer implemented method for predicting a route of a vehicle, and estimating length of the predicted route, wherein the method comprises, via one or more computer processors:
   determining current geographical position of the vehicle;
   detecting a stored cell border of a cell in a grid-based representation of a landscape, comprising a plurality of cells in a database, corresponding to the determined geographical position;
   determining that the vehicle is entering the cell at the detected cell border of the cell;
   extracting a stored driving direction at the detected cell border of the cell from the database;
   detecting a cell border of a neighbor cell to the cell, in the direction of the extracted stored driving direction at the detected cell border of the cell;
   repeating the steps of extracting the stored driving direction and detecting a cell border of a neighbor cell until a condition is fulfilled;
   predicting the route of the vehicle by creating a series of linear segments through the cells, bounded by the detected cell borders; and
   estimating the length of the predicted route of the vehicle by adding an estimated distance through each cell of the predicted route of the vehicle.

7. The method according to claim 6, wherein the estimation of the length of the predicted route is performed by:
   estimating a point of entrance and a point of exit of each cell along the predicted route, wherein the point of exit is situated in the extracted driving direction associated with the cell border of the point of entrance of the cell;
   calculating the length of the distance between the point of entrance and the point of exit for each of the cells; and
   adding the calculated lengths to each other.

8. A control unit, for predicting a route of a vehicle, and estimating length of the predicted route, wherein the control unit comprises:
   at least one processor;
   a non-transitory computer readable medium; and
   a computer program product comprising computer program code stored on the non-transitory computer-readable medium readable by a computer, said computer program product comprising computer instructions to cause one or more computer processors to perform the following operations:
      determining current geographical position of the vehicle;
      detecting a stored cell border of a cell in a grid-based representation of a landscape, comprising a plurality of cells in a database, corresponding to the determined geographical position;
      determining that the vehicle is entering the cell at the detected cell border of the cell;
      extracting a stored driving direction at the detected cell border of the cell from the database;
      detecting a cell border of a neighbor cell to the cell, in the direction of the extracted stored driving direction at the detected cell border of the cell;
      repeating the steps of extracting the stored driving direction and predicting the route of the vehicle until a condition is fulfilled;
      predicting the route of the vehicle by creating a series of linear segments through the cells, bounded by the detected cell borders; and
      estimating the length of the predicted route of the vehicle by adding an estimated distance through each cell of the predicted route of the vehicle.

9. A computer program product comprising computer program code stored on a non-transitory computer-readable medium readable by a computer, said computer program product for building a database, enabling prediction of a route of a vehicle, and estimation of the length of the predicted route, said computer program product comprising computer instructions to cause one or more computer processors to perform the following operations:

establishing a grid-based representation of a geographical landscape, comprising a plurality of cells;
determining current geographical position of the vehicle;
detecting that the determined geographical position of the vehicle corresponds to a cell border of a cell in the established grid-based representation;
determining a driving direction of the vehicle and an angle of the vehicle relative to a reference when the vehicle passes the cell border for entering the cell; and
storing the determined driving direction and angle, associated with the cell border of the cell in the database.

10. A vehicle comprising a control unit comprising:
at least one processor;
a non-transitory computer readable medium; and
a computer program product comprising computer program code stored on the non-transitory computer-readable medium readable by a computer, said computer program product comprising computer instructions to cause one or more computer processors to perform the following operations:
establishing a grid-based representation of a geographical landscape, comprising a plurality of cells;
determining current geographical position of the vehicle;
detecting that the determined geographical position of the vehicle corresponds to a cell border of a cell in the established grid-based representation;
determining a driving direction of the vehicle and an angle of the vehicle relative to a reference when the vehicle passes the cell border for entering the cell; and
storing the determined driving direction and angle, associated with the cell border of the cell in the database.

\* \* \* \* \*